No. 864,227. PATENTED AUG. 27, 1907.
A. J. BRASS.
CORN PICKER.
APPLICATION FILED MAR. 29, 1907.

2 SHEETS—SHEET 1.

Attest:

Inventor:
Albert J. Brass.

No. 864,227.

PATENTED AUG. 27, 1907.

A. J. BRASS.
CORN PICKER.
APPLICATION FILED MAR. 29, 1907.

2 SHEETS—SHEET 2.

Attest:

Inventor:
Albert J. Brass.

UNITED STATES PATENT OFFICE.

ALBERT J. BRASS, OF NEW YORK, N. Y., ASSIGNOR TO INTERNATIONAL HARVESTER COMPANY, A CORPORATION OF NEW JERSEY.

CORN-PICKER.

No. 864,227.　　　　　Specification of Letters Patent.　　　　Patented Aug. 27, 1907.

Application filed March 29, 1907. Serial No. 365,246.

*To all whom it may concern:*

Be it known that I, ALBERT J. BRASS, a citizen of the United States, residing at New York city, in the county of New York and State of New York, have invented certain new and useful Improvements in Corn-Pickers, of which the following is a specification.

My invention relates to corn pickers of a well-known type and consists particularly in an improved form of snapping rolls and improved means, taking the form of a toothed disk, for forcing the corn stalks between the rolls.

Figure 1:
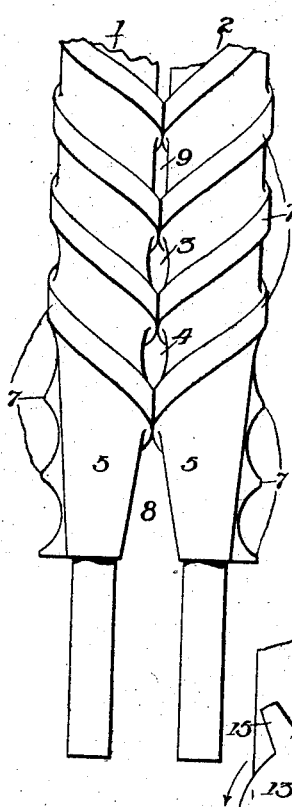
Figure 2:
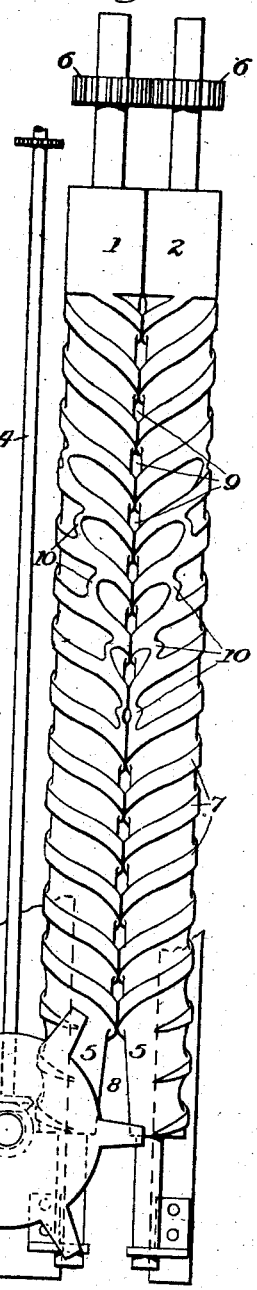
Figure 3:
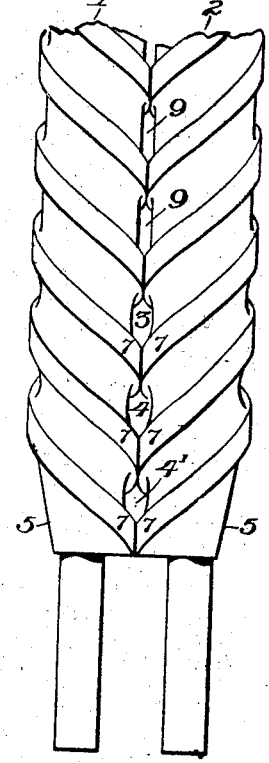
Figure 4:
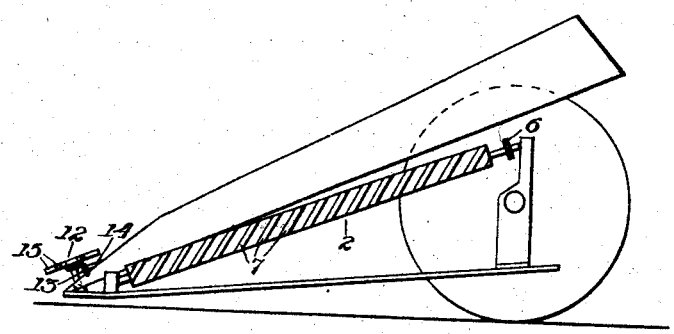
Figure 5:
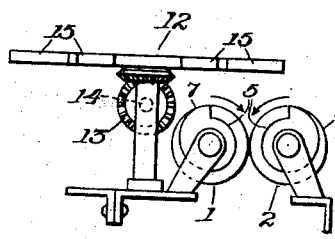

In the annexed drawings—Figure 1 is a plan view of the lower ends of the snapping rolls in what may be termed the open position. Fig. 2 is a plan view of the snapping rolls after the same have been turned about 90 degrees from the position shown in Fig. 1. Fig. 3 is plan view of the lower part of the rolls after they have been revolved about 90 degrees further. Fig. 4 is an elevation of the picker; and Fig. 5 is a front elevation of the feeding disk, which is shown in plan in Fig. 2.

The snapping rolls 1 and 2 consist of screw threaded cylinders. These cylinders may be provided with one or more threads, the number of threads depending upon their pitch, the character of the corn operated upon and other conditions encountered in the use of the machine.

It has been customary to taper snapping rolls of the character referred to at their forward ends in order to facilitate the entrance of the corn stalk. When the screw threads are tapered and no part of the forward ends of the rolls contact, it frequently happens, especially in the case of small stalks, that the rolls do not secure sufficient hold upon the stalks to draw them back between the snapping rolls. The result of this action is that the corn picker rides over the stalk without drawing it down between the rolls and detaching the ears therefrom in the desired manner. In order to overcome this difficulty I have constructed the threads upon the snapping rolls of substantially uniform height throughout the length of such threads, but have not carried all of the threads completely to the forward ends of the rolls; in other words, a portion of the forward end of the rolls is formed without threads. The space between the threads is progressively deepened toward the forward end of the rolls, as indicated by the numerals 3, 4 and 4', and the blank or threadless portion 5 is tapered toward the forward end of the rolls. The rolls are provided at their upper ends with spur gears 6, and these gears are so intermeshed that in the revolution of the rolls the threadless tapered portions 5 arrive at their inner portions shown in Fig. 1 simultaneously.

As above stated, the upper surface 7 of the threads is of uniform height throughout. It will be apparent, therefore, that as the rolls rotate there will at one period in their revolution be a converging open space 8 between their forward ends. As the rolls are rotated this space will be closed, as shown in Fig. 3, by the threads 7, which, as above stated, are of uniform height throughout the length of the snapping rolls. As the space 8 is thus closed the stalk will be firmly seized between the rolls. As the operation of the machine continues and the rolls are carried forward their rotation will draw the stalk downward and snap off the ears as they approach the rolls.

In order to render the operation of the rolls positive and to avoid the possibility of a small stalk not being properly drawn downward, I have connected the threads upon the snapping rolls by connecting bridges 10 of the same height as the threads. These connecting bridges are arranged in spiral form upon the rolls, and in the event of a stalk being too small to be properly held in the spaces 9 between the threads, such stalks will be firmly grasped by the connecting bridges 10, as will clearly appear from Fig. 2 of the drawings.

In order to render the entrance of the stalk between the rolls more certain, I have provided a feeding disk 12, which may be rotated by means of a bevel gear 13 mounted upon a shaft 14. This shaft, as well as the snapping rolls, may be rotated in the customary manner by a suitable sprocket chain connected with the main shaft of the machine. As such connections are old in the art and form no part of my invention, further description thereof is unnecessary in this connection. The feeding disk 12 is provided with teeth 15 and is designed to be rotated in a direction as viewed in Fig. 2 contrary to the movement of the hands of a clock. The teeth 15 will force the stalks back into the space 8 between the snapping rolls, and the latter, upon their rotation to the position shown in Fig. 3, will grasp the stalk in the manner above described and feed it backwards and downwards for the purpose of stripping the ears.

From the foregoing it will be apparent that the operation of my device is not dependent upon the frictional hold of the tapered ends of the snapping rolls upon the stalks, but that the tapered opening 8 affords a space wherein the stalk may be received and remain until it is grasped by the rolls when they have revolved to the position shown in Fig. 3, thus bringing the screw threads 7 in engagement therewith. The feeding of the stalks to the rolls is therefore independent of their size and the progress of the stalks through the rolls is also insured regardless of their size, by means of the connecting bridges 10, as above described.

The essential feature in the formation of the threads on the snapping rolls is that the rolls be left blank or threadless for a portion of their length adjacent the forward ends, and that such blank portions be tapered as above described. While in Fig. 2 of the drawings I have shown the three threads as terminating along a line parallel to the axis of the rolls, it is not necessary that they should terminate in this manner, as in some instances it may be found desirable to continue some of the threads further around the roll than others.

I claim:

1. A corn picker comprising a pair of snapping rolls, each tapered at the forward end on one side only and having a spiral projection or screw thread of uniform diameter throughout its length, terminating adjacent said tapered portion.

2. In a corn picker, a pair of snapping rolls, the outer surface of one side of which is parallel to the axis and the other side being tapered at the forward end.

3. In a corn picker, a pair of snapping rolls, one of said rolls having its surface parallel to its axis on one side and on the other side being tapered at the forward end.

4. A corn picker comprising a snapping roll provided with a screw threaded portion and having at its forward end an unthreaded tapered portion, and connecting bridges between adjoining portions of said thread.

5. A corn picker comprising a snapping roll provided with a spiral projection or screw thread, and a spiral series of bridges between adjoining portions of said thread.

6. A snapping roll for a corn picker provided with a plurality of spiral projections or screw threads, and a spiral series of connecting bridges between said threads.

7. A corn picker comprising a pair of snapping rolls having tapered forward ends, said rolls being tapered more on one side than the other.

ALBERT J. BRASS.

Witnesses:
MARGARET A. SWEENEY,
TINE N. DAGGETT.